Patented July 26, 1949

2,476,967

UNITED STATES PATENT OFFICE 2,476,967

TERNARY COPOLYMERS AND CASTING OF FILMS THEREOF

Edward L. Fiedler, Midland, Mich., assignor to The Dow Chemical Company, Midland, Mich., a corporation of Delaware No Drawing. Application June 27, 1946, Serial No. 679,879

2 Claims. (Cl. 260—86.5)

This invention concerns new solid ternary copolymers and a method and compositions for casting films thereof. It pertains especially to aqueous colloidal solutions of certain of the copolymers, which solutions, when spread on a solid surface, dry to leave a smooth continuous film of the copolymer. It also pertains especially to the particular new copolymers which may thus be cast as smooth films from the aqueous colloidal solutions.

The copolymers provided by the invention are of a monovinyl aromatic compound, an aliphatic conjugated diolefine and a vinylidene halide chemically combined in proportions such that the polymeric product contains at least 5 per cent by weight of each of the three kinds of monomeric compounds just mentioned. The polymeric products vary from soft rubbery materials to hard resins, depending upon the relative proportions of vinyl aromatic compound, diolefine and vinylidene halide of which they are composed. In general, an increase in the proportion of vinylidene halide in the copolymers, particularly above a value of 40 per cent by weight, tends to cause hardening, or embrittlement, of the copolymer. With increase in the proportion of the vinyl aromatic component in the copolymers, films of the latter become more resistant to tearing, but such increase above a value of about 60 per cent by weight usually causes the copolymer to be hard, or brittle. Increasing proportions of the diolefine component result in softening, or the development of rubbery properties, on the part of the copolymer. For instance, the ternary copolymers of styrene, butadiene and vinylidene chloride which contain 60 per cent or less of styrene, at least 25 per cent of butadiene and 40 per cent or less of vinylidene chloride are rubbery materials which may be used as substitutes for rubber, e. g. in electric insulating compositions, or as coating materials for fabrics, paper, or wood, etc. The invention pertains especially to copolymers of vinyl aromatic compounds, diolefines and vinylidene halides chemically combined within the range of proportions last stated. Most ternary copolymers having compositions outside said range are thermoplastic resinous materials which may be used, alone or in admixture with other thermoplastic resins, in preparing molded articles.

Among the rubbery copolymers provided by the invention are certain ones which, when colloidally dispersed in water, may be cast directly from the dispersion as smooth continuous films by spreading the dispersion on a solid surface, e. g. of wood, paper, glass, or metal, and permitting it to dry. It is not necessary, in order to obtain such film, that a plasticizing agent, or other organic diluent, be present in the colloidal dispersion; hence, films of the copolymers free of plasticizing agents are readily prepared. If desired, a plasticizing agent, or a coloring agent, etc., may, of course, be incorporated in the aqueous dispersions prior to casting the films. The ternary copolymers best adapted to such film casting operation are those composed of between 15 and 50 per cent by weight of a vinyl aromatic compound, between 35 and 60 per cent of a diolefine and less than 25 per cent of a vinylidene halide. In particular, the copolymer of about 40 per cent styrene, 40 per cent butadiene and 20 per cent vinylidene chloride, when thus cast from an aqueous colloidal solution thereof, forms a clear, colorless, transparent, flexible film having good resistance to discoloration by light. This film, when cast upon wood or paper adheres tightly to the supporting member and forms a coating thereon. This copolymer and aqueous colloidal solutions thereof are preferred species of the products provided by the invention.

Examples of monovinyl aromatic compounds which may be used in making the ternary copolymers are styrene, ortho-methyl-styrene, meta-methyl-styrene, para-methyl-styrene, ortho-ethyl-styrene, meta-ethyl-styrene, para-ethyl-styrene, para-isopropyl-styrene, vinyl-naphthalene, etc., and also mixtures thereof. All such compounds have the vinyl group attached directly to a carbon atom of the aromatic nucleus. Of the vinyl aromatic compounds just mentioned, styrene is preferred.

The aliphatic conjugated diolefines which may be used in preparing the copolymers are ones having from four to six carbon atoms in the molecule. Examples of such diolefines are butadiene-1.3, isoprene, and 2.3-dimethyl-butadiene-1.3, etc. Mixtures of two or more of the diolefines can be used.

As the vinylidene halide component of the copolymer, vinylidene chloride is preferred, but vinylidene bromide or vinylidene chlorobromide, etc., may be used. Also, a mixture of two or more of such vinylidene halides may be employed.

A mixture of the vinyl aromatic compound, diolefine and the vinylidene halide may be polymerized in any of the usual ways, e. g. en masse, or in solution in an inert organic solvent such as benzene, toluene, or chlorobenzene, or in suspension in water, or while emulsified with water and, when operating in any such manner, in the presence or absence of a peroxide or other polymerization catalyst. In practice, the polymerization is preferably accomplished by forming an aqueous emulsion of the polymerizable compounds and heating the emulsion under pressure, e. g. in a closed vessel, usually at temperatures between 50° and 100° C. until the polymerization is nearly complete. Any of the usual emulsifying agents, e. g. soaps, sulphonic acids of aliphatic and alkylaromatic hydrocarbons of high molecular weight, or sodium or potassium salts of such sulphonic acids, etc., may be used in preparing the emulsion.

After completing the reaction, the copolymer product may, if desired, be coagulated or precipitated in known ways, e. g. by freezing the mixture, or by adding thereto a coagulating agent such as hydrochloric acid, sulphuric acid, sodium chloride, or calcium chloride, etc., and be separated from the mixture and dried. The products thus separated may be compounded with usual rubber-compounding agents, e. g. vulcanizers, plasticizers, antioxidants, pigments, or fillers, etc., and be heat cured to effect vulcanization thereof. However, the aqueous colloidal solutions of ternary copolymers of from 15 to 50 per cent of a vinylaromatic compound, from 35 to 60 per cent of a diolefine and from 5 to 25 per cent of a vinylidene halide, obtained by the emulsion polymerization reaction, may be applied directly, e. g. by brushing, spraying, or dipping, to a solid surface such as that of wood, paper, or steel, and be dried at room temperature or at an elevated temperature to obtain a thin uniform film of the copolymer. The film thus obtained is flexible, resistant to discoloration by light, and, when formed on a surface of wood or paper, adheres tightly to the supporting surface. If desired, a vulcanizing agent, e. g. sulphur, etc., may be incorporated in the emulsion prior to casting the film and the latter may thereafter be heated to effect vulcanization of the same.

The following examples describe certain ways in which the principle of the invention has been applied, but are not to be construed as limiting the invention.

EXAMPLE 1

In each of a series of experiments, about 50 parts by weight of the polymerizable compounds, styrene, butadiene and vinylidene chloride, in the relative proportions indicated in the following table was admixed in a closed vessel with 50 parts of an aqueous solution consisting of approximately 99.62 per cent of water, 0.16 per cent of potassium persulphate, 0.13 per cent of Aquarex D (i. e. the monosodium sulphate esters of a mixture of higher fatty alcohols, principally lauryl and myristic alcohols) and 0.09 per cent of sodium bicarbonate. The butadiene was introduced into the vessel under a pressure sufficient to liquefy the same. The mixture was agitated to effect emulsification and then heated with continued agitation at a temperature of about 95° C. until the decrease in vapor pressure of the mixture, resulting principally from consumption of the butadiene in the polymerization reaction, was nearly complete. The time of heating, in different runs, varied from two to thirty hours and usually was in the order of from fifteen to twenty hours. After completing the reaction, the vessel was cooled, the pressure released, and the resultant aqueous colloidal solution of the product was removed. Each such solution was cooled sufficiently to cause coagulation of the polymeric product and the latter was removed from the liquor, washed with water, and dried. The dried product was treated with 20 per cent of its weight of carbon black, 10 per cent of dibutyl sebacate, 4 per cent of sulphur, 4 per cent of zinc oxide, 2 per cent of mercaptobenzothiazole and 1 per cent of stearic acid and the mixture was compounded, rolled into a sheet and cured by heating under pressure to 148° C. for 20 minutes. Standard test strips were cut from the cured sheet and were used in determining the tensile strength, the per cent ultimate elongation and the Shore durometer hardness of the material. The tensile strength and per cent elongation values were determined in accordance with directions given in A. S. T. M. D412–39T. The following table gives the per cent by weight of styrene, butadiene and vinylidene chloride employed in making each copolymer, based on the combined weight of these compounds. It also indicates whether the copolymer, prior to being compounded and cured, was resinous or rubbery, and it gives the tensile strength in pounds per square inch of initial cross section, the per cent ultimate elongation value and the Shore durometer hardness of each compounded and cured product.

Table

| Run No. | Copolymer of— | | | Uncured Copolymer | Compounded and Cured Product | | |
|---|---|---|---|---|---|---|---|
| | Styrene, Per Cent | Butadiene, Per Cent | Vinylidene Chloride, Per Cent | | Tensile Strength, lbs./sq. in. | Per Cent Elongation | Hardness |
| 1 | 70 | 10 | 20 | Resinous | 980 | 110 | 75 C |
| 2 | 64 | 16 | 20 | do | 1,130 | 270 | 40 C |
| 3 | 20 | 20 | 60 | do | 900 | 30 | 68 C |
| 4 | 30 | 20 | 50 | do | 920 | 30 | 74 C |
| 5 | 55 | 25 | 20 | do | 2,680 | 80 | 85 C |
| 6 | 50 | 25 | 25 | Rubbery | | | |
| 7 | 50 | 30 | 20 | do | 2,640 | 190 | 73 C |
| 8 | 60 | 35 | 5 | do | 1,880 | 320 | |
| 9 | 40 | 40 | 20 | do | 2,750 | 270 | 40 C |
| 10 | 20 | 40 | 40 | do | 2,010 | 110 | 60 C |
| 11 | 30 | 50 | 20 | do | 830 | 300 | 18 C |
| 12 | 20 | 60 | 20 | do | 480 | 190 | 20 C |

EXAMPLE 2

Aqueous colloidal solutions of copolymers of styrene, butadiene and vinylidene chloride, which solutions had been prepared by polymerizing mixtures of the corresponding monomers in aqueous emulsions thereof, as described in Example 1, were applied as thin layers both on a surface of glass and on one of paper and were permitted to dry at room temperature and atmospheric pressure. It was observed that such colloidal solutions of the copolymer of 40 per cent styrene, 40 per cent butadiene, and 20 per cent vinylidene chloride and of the copolymer of 20 per cent styrene, 40 per cent butadiene, and 40 per cent vinylidene chloride dried to leave smooth, uniform, transparent flexible films of the copolymers. Colloidal solutions of copolymers richer or poorer in butadiene, upon being similarly applied and dried, did not form films of as good appearance or quality, i. e. in many instances the films were rough, or became discolored under exposure to the air, or were hard and brittle. It was also noted that the films of the above-mentioned copolymers containing 40 per cent of butadiene, when formed on a surface of paper, adhered firmly as a coating on the paper. Films of these same copolymers, of 40 per cent butadiene content, upon being stripped from the glass surfaces on which they were formed, were highly flexible even at temperatures below 0° C., e. g. the film of the copolymer of 20 per cent styrene, 40 per cent butadiene and 40 per cent vinylidene chloride was flexible at —35° C.

Other modes of applying the principle of the invention may be employed instead of those explained, change being made as regards the polymers or compositions herein disclosed, provided the polymers or ingredients stated by any of the following claims or the equivalent of such stated polymers or ingredients be employed.

I particularly point out and claim as my invention:

1. A solid rubbery copolymer of approximately 40 per cent styrene, approximately 40 per cent butadiene and approximately 20 per cent vinylidene chloride, which copolymer may be cast from an aqueous dispersion thereof as a flexible, but tightly adhering, smooth film on a surface of wood by applying a film of the dispersion to the wood and evaporating water from the film.

2. An aqueous colloidal solution of a copolymer as defined by claim 1.

EDWARD L. FIEDLER.

REFERENCES CITED

The following references are of record in the file of this patent:

UNITED STATES PATENTS

| Number | Name | Date |
|---|---|---|
| 2,380,356 | Youker | July 10, 1945 |

FOREIGN PATENTS

| Number | Country | Date |
|---|---|---|
| 731,982 | Germany | Feb. 18, 1943 |